United States Patent
Suzuki et al.

[11] Patent Number: 6,005,239
[45] Date of Patent: Dec. 21, 1999

[54] IMAGE INTENSIFIER

[75] Inventors: Hideki Suzuki; Minoru Kondo; Masuo Ito; Yoshitoshi Ishihara, all of Hamamatsu, Japan

[73] Assignee: Hamamatsu Photonics K.K., Hamamatsu, Japan

[21] Appl. No.: 08/988,236

[22] Filed: Dec. 10, 1997

[30] Foreign Application Priority Data

Dec. 10, 1996 [JP] Japan .................................. 8-346708

[51] Int. Cl.⁶ .................................................... H01J 29/24
[52] U.S. Cl. .................................. 250/214 VT; 250/207; 313/372; 313/475
[58] Field of Search ................................ 250/208.6, 207, 250/214 VT; 313/372, 475, 333–336, 103 CM, 105 CM

[56] References Cited

U.S. PATENT DOCUMENTS

| | | |
|---|---|---|
| 4,264,408 | 4/1981 | Benham . |
| 4,647,811 | 3/1987 | Galves et al. . |
| 4,654,558 | 3/1987 | Obata et al. ............................. 313/372 |
| 4,684,846 | 8/1987 | Duchenois et al. ..................... 313/475 |
| 4,886,537 | 12/1989 | Patrick . |

FOREIGN PATENT DOCUMENTS 0 170 310 A1  2/1986  European Pat. Off. .
62-252043   2/1987  Japan .

Primary Examiner—Edward P. Westin
Assistant Examiner—Thanh X. Luu
Attorney, Agent, or Firm—Pillsbury Madison & Sutro LLP

[57] ABSTRACT

In an image intensifier comprising an entrance faceplate, made of a material transparent to light, having a photoelectric surface, formed on a surface opposite to a light entrance surface, for photoelectrically converting incident light into an electron; and an optical fiber block, constituted by a plurality of optical fibers bundled together, having a phosphor face at an end face of each optical fiber on the light entrance side, for emitting light in response to the electron incident thereon; the photoelectric surface of the entrance faceplate and the phosphor face of the optical fiber block opposing each other, while a vacuum atmosphere being formed therebetween; the optical fiber block is provided with a pit in which an end face of a core portion of each optical fiber is recessed from an end face of a cladding portion thereof, the bottom of the pit is filled with a phosphor, the surface of this phosphor is provided with a metal back layer, the cladding portion projects from the surface of the phosphor toward the entrance surface by a predetermined height, and the projecting surface of the cladding portion is provided with a metal film.

2 Claims, 9 Drawing Sheets

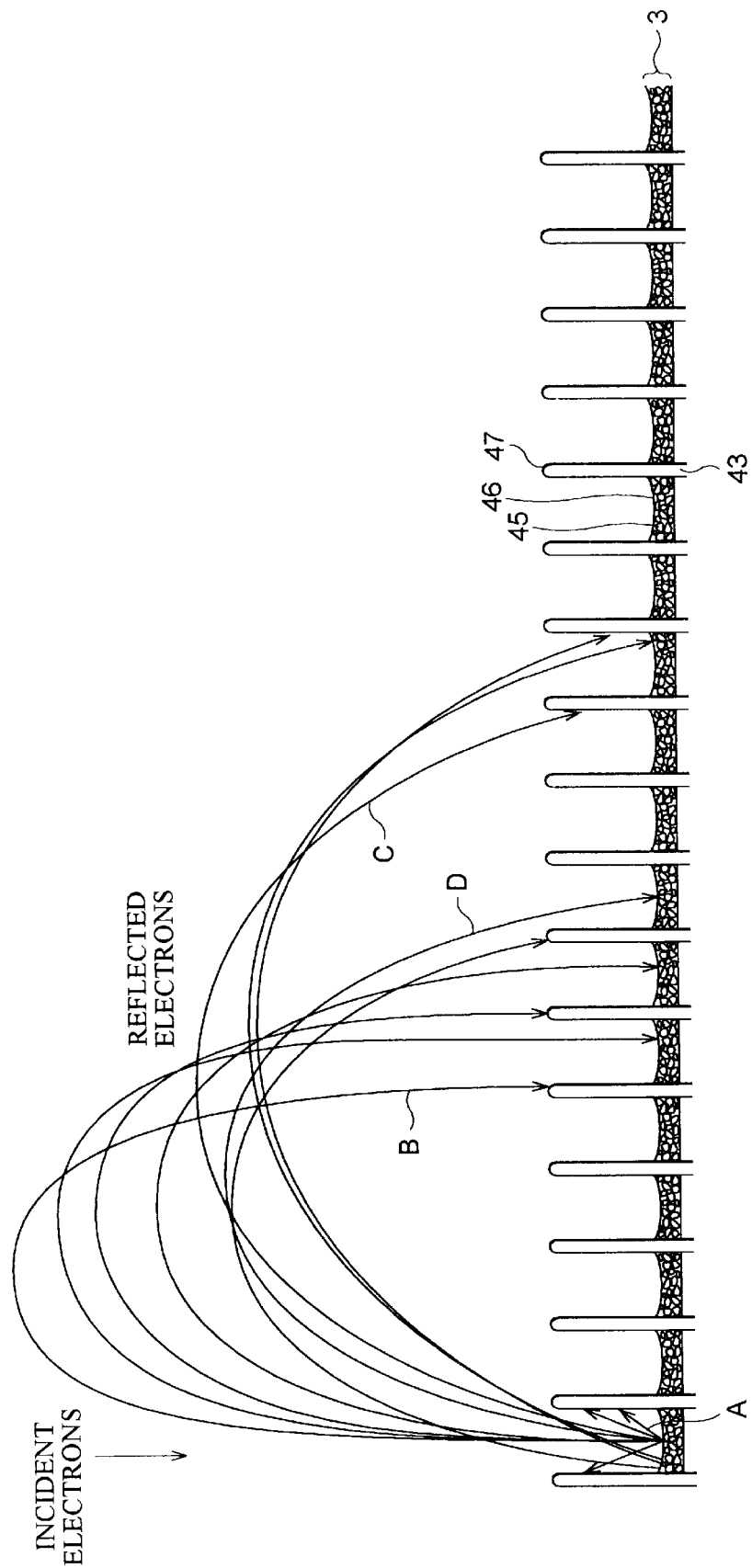

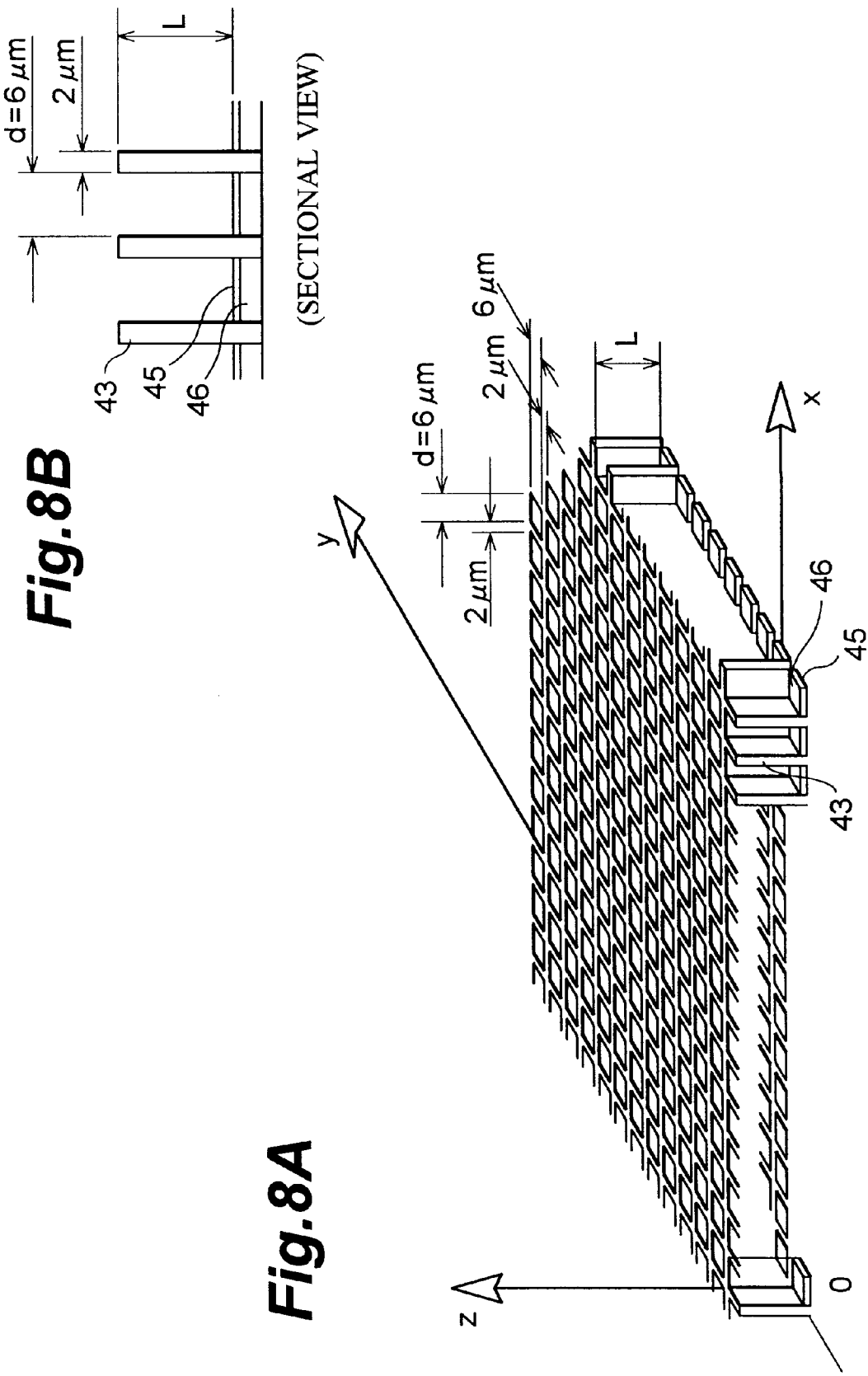

IMAGE INTENSIFIER

BACKGROUND OF THE INVENTION

1. Field of the Invention

The present invention relates to an image intensifier.

2. Related Background Art

FIG. 2 is a configurational view showing a typical proximity-type image intensifier.

The image intensifier shown in FIG. 2 is constituted, successively in a row from its light entrance surface side, by a photoelectric plate 1, an microchannel plate (MCP) 2, and an optical fiber block 4. An output phosphor face 3 is formed on the surface of the optical fiber block 4 on the entrance surface side. When light is incident on the entrance surface of the photoelectric plate 1, due to photoelectric conversion, an electron is emitted from the surface of the photoelectric plate 1 opposite to the entrance surface. This electron is accelerated and amplified by the MCP 2, and then impinges on the phosphor face 3, thus emitting fluorescent light. The emitted light is guided through the optical fiber block 4 to the output side, whereby the incident light is amplified so as to yield output light. In the proximity-type image intensifier, the phosphor face 3 and the MCP 2 are disposed close to each other, thereby enhancing image reproducibility while attaining a compact configuration.

In order to improve the output resolution of the image intensifier, various proposals have been made concerning the improvement of the output phosphor face. For example, one such proposal is disclosed in Japanese Patent Application Laid-Open No. 62-252043. According to the technique disclosed therein, as shown in FIG. 3, a core portion 42 on the entrance surface side of the optical fiber block 4 is formed with a pit 44 with respect to a cladding portion 43, and after the pit 44 is filled with a phosphor 45, a metal back layer 46 is formed on the surface on the entrance side.

In contrast to the case where a phosphor layer is uniformly applied to the whole surface of the optical fiber block on the entrance surface side, a higher ratio of light generated in the phosphor 45 is made incident on the core portion 42, and the loss caused by the light leaked into and absorbed by the cladding portion 43 can be reduced. This enhances transmission efficiency, while light from leaking into the adjacent core, thereby improving the resolution as well.

Nevertheless, the following problems may occur due to the fact that the electron is reflected on the output phosphor face. A part of the electrons accelerated from the MCP 2 are diffusely reflected by the surface of the metal back layer 46 of the phosphor face 3 when impinging thereon. FIG. 4 shows a state of this diffuse reflection. Between the MCP 2 and the phosphor face 3, an electric field is generated by virtue of a voltage applied thereto. As shown in FIG. 4, the path of the diffusely reflected electron is deflected use to this electric field. As such the electron may re-impinge on a wide area of the phosphor face 3.

Consequently, when a strong spot light enters the image intensifier, it allows a large amount of electrons to be incident on a narrow area of the phosphor face 3 from the MCP 2, and the electron, diffusely reflected on the phosphor face 3, may re-impinge on the phosphor face 3 over a much wider area than the initial incident area. As a result, a fluorescence effect may be generated in and outputted from an area wider than the incident area of the original spot light, thus deteriorating output resolution. This deterioration is commonly known as the halo phenomenon of output light.

This halo phenomenon can be reduced when the distance between the MCP 2 and the phosphor face 3 is decreased. Nevertheless, because there is a limit to the minimal distance therebetween, due to pressure resistance, it has conventionally been difficult to suppress the halo phenomenon. As such, output resolution with respect to strong spot light has been hard to improve.

SUMMARY OF THE INVENTION

It is an object of the present invention to provide an image intensifier which can yield an improved output resolution even with respect to strong spot light.

The present invention provides an image intensifier comprising an entrance faceplate, made of a material transparent to light, having a photoelectric surface, formed on a surface opposite to a light entrance surface, for photoelectrically converting incident light into an electron. Also provided is an optical fiber block, constituted by a plurality of optical fibers bundled together, having a phosphor face at an end face of each optical fiber on the light entrance side, for emitting light in response to the electron incident thereon. The photoelectric surface of the entrance faceplate and the phosphor face of the optical fiber block oppose each other, while a vacuum atmosphere is formed therebetween. The phosphor face of the optical fiber block is provided with a pit in which an end face of a core portion of each optical fiber constituting the optical fiber block is recessed from an end face of a cladding portion thereof, and a phosphor is embedded in each pit, while the cladding portion projects from a surface of the phosphor by a predetermined height, the projecting surface of the cladding portion being provided with a metal film.

Consequently, the pit formed at the core portion of each optical fiber on the entrance-side end face of the optical fiber block is provided with a phosphor face, whereas the formed phosphor faces are connected to each other through the metal film formed on the projecting surface of the cladding portion at the entrance-side end face of the optical fiber block. Accordingly, individual phosphor faces partitioned so as to correspond to the respective optical fibers are provided, while being recessed from the entrance surface and separated from each other. Because all of these phosphor faces are electrically connected to each other, the same voltage can be applied to all the phosphor faces.

Also, a metal film may be formed on the phosphor face. This metal film functions as a metal back layer with respect to the phosphor face, whereby the light generated in the phosphor is effectively guided to the optical fiber.

Further, the projecting height of the cladding portion is preferably at least 0.5 times diameter of the core portion. In particular, it is preferably at least 1.0 times diameter of the core portion. Consequently, each phosphor face can be separated from its adjacent phosphor face more securely, thus suppressing mutual influences among the phosphor faces.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6 and 7 are views each showing tracks of electrons on the entrance surface of the optical fiber block in accordance with an embodiment of the present invention;

FIG. 8A is a perspective view showing an optical fiber block in accordance with an embodiment of the present invention subjected to an experiment and simulation;

FIG. 8B is a partially enlarged view thereof;

DETAILED DESCRIPTION OF THE PREFERRED EMBODIMENTS

Figure 1:
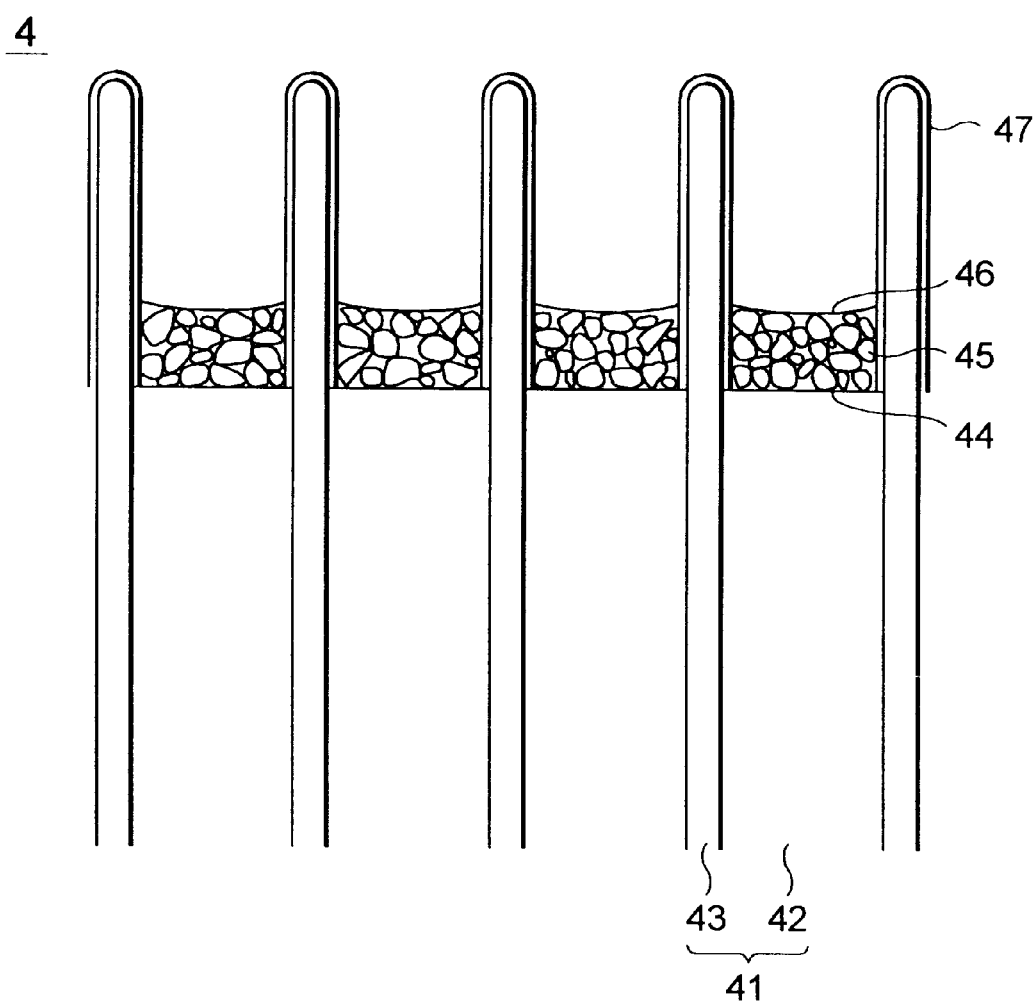
FIG. 1 is an enlarged sectional view showing an optical fiber block in accordance with an embodiment of the present invention on its entrance surface side.

In the following, an embodiment of the present invention will be explained with reference to the accompanying drawings. FIG. 1 is an enlarged view showing the optical fiber block in accordance with this embodiment.

Figure 2:
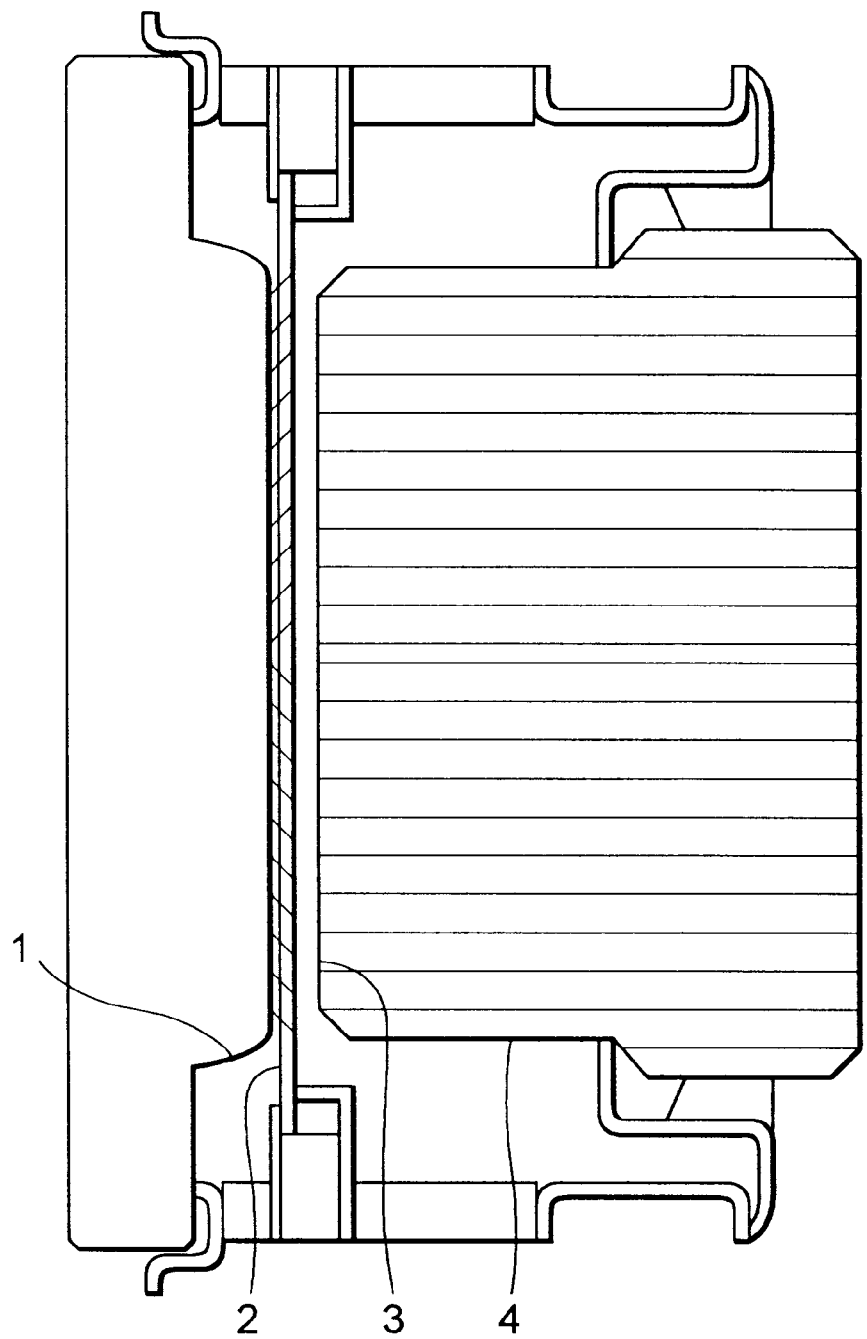
FIG. 2 is a configurational view showing a typical proximity-type image intensifier.

Since the basic configuration of the image intensifier in this embodiment is the same as the typical proximity-type image intensifier shown in FIG. 2, no explanation will be provided for the overall configuration and operation thereof. First, the configuration of its optical fiber block 4 will be explained with reference to FIG. 1. Basically, the optical fiber block 4 has a configuration in which a number of optical fibers 41, each comprising a core portion 42 and a cladding portion 43 with a lower refractive index covering the core portion 42, are bundled together. Consequently, light incident on the core portion 42 can be efficiently be transmitted to the output side.

The end face of the core portion 42 on the entrance surface side is recessed from the end face of the cladding portion 43 so as to form a pit 44, whose bottom is filled with a phosphor 45 which emits light upon electron bombardment. The part filled with the individual phosphor 45 corresponds to the phosphor face 3 shown in FIG. 2. Accordingly, the individual phosphor faces 3 are respectively provided for the individual optical fibers 41. The surface of the phosphor 45 is provided with a metal back layer 46. The cladding portion 43 projects from the surface of the phosphor 45 toward the entrance surface, and its tip end is rounded. The individual phosphor faces 3 are separated from each other by the cladding portion 43. The surface of the projecting part of the cladding portion 43 is provided with a metal film 47. Accordingly, the individual phosphors 45 embedded within the respective pits 44 are electrically connected to each other through the metal film 47. Current is supplied to the metal back layer 46 through the metal film 47, whereby a voltage is applied between the metal back layer 46 and the MCP 2 shown in FIG. 2, thus forming an electric field therebetween.

Figure 5A:
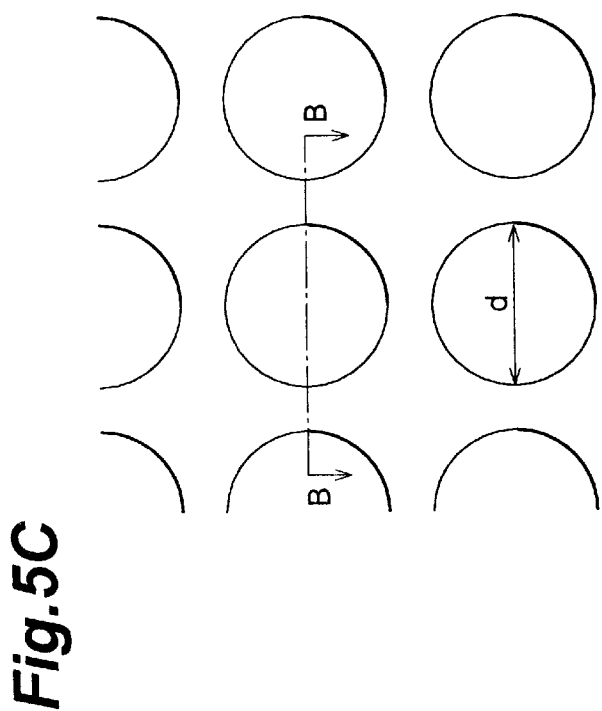
FIG. 5A is an enlarged front view showing the entrance surface of the optical fiber block in accordance with an embodiment of the present invention.
Figure 5B:
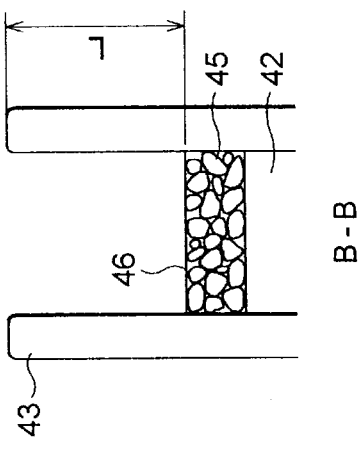
FIG. 5B is an enlarged sectional view taken along line A—A thereof.
Figure 5C:
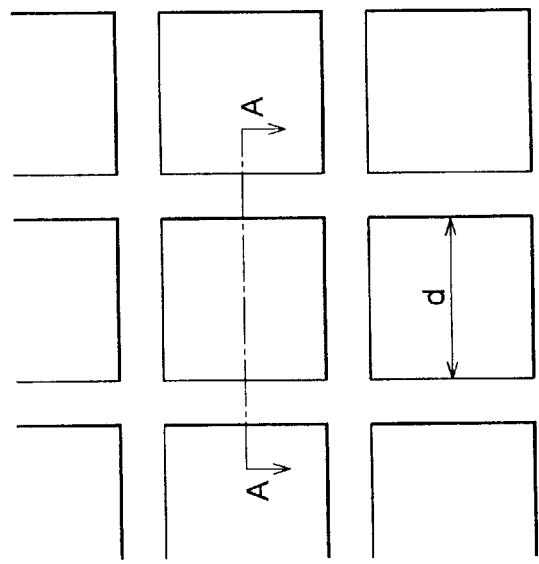
FIG. 5C is an enlarged front view showing the entrance surface of the optical fiber block in accordance with another embodiment of the present invention.
Figure 5D:
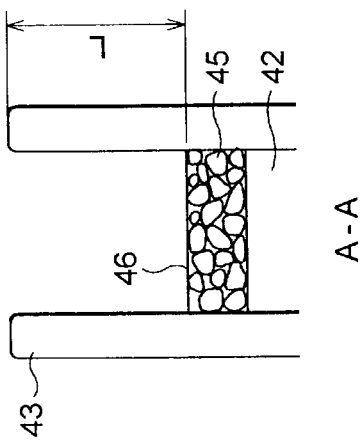
FIG. 5D is an enlarged sectional view taken along line B—B thereof.

As the optical fiber 41, either an optical fiber whose core portion 42 has a square cross section as shown in FIGS. 5A and 5B or an optical fiber whose core portion 42 has a circular cross section as shown in FIGS. 5C and 5D, may be used. In the case of an optical fiber having a square cross section, the length of one side thereof will be heretofore referred to as the diameter. Therefore, the diameter of the core portion and the projecting height of the cladding portion will be hereinafter referred to as d and L, respectively.

Thus, the optical fiber block 4 can be configured, for example, as follows. First, a number of optical fibers are bundled, and end faces of the core portion 42 and cladding portion 43 are processed into flat surfaces while being aligned with each other. Then, the formed bundle is etched with an acid or alkali solution which can selectively erode the core portion 42, so as to form a desired depth of the pit 44. The depth of the pit 44 can be controlled by a precision of $\mu$m unit when the concentration, reaction time, and reaction temperature of the etching solution are regulated. After the pit 44 is formed, the tip of the cladding portion 43 is rounded by etching, and then the metal film 47 is deposited on the exposed surface of the cladding 43.

Subsequently, the bottom portion of thus formed pit 44 is forcibly filled with the grains of phosphor 45 by centrifugal sedimentation. Such as type P11 (ZnS: Ag), P20 ((Zn, Cd)S: Ag), P24 (ZnO: Zn), P43 ($Gd_2O_2S$: $Tb^{3+}$), P46 ($Y_3Al_5O_{12}$: $Ce^{3+}$) or P47 ($Y_2SiO_5$: $Ce^{3+}$) fluorescent material can be used for the phosphor 45. Preferably the grain of the phosphor 45 has 2.0 $\mu$m mean diameter. Because it is difficult to fill the bigger grain to the pit 44 and smaller grain has smaller light conversion efficiency than this grain.

Here, as the amount of phosphor 45 is adjusted, the height of the cladding portion 43 projecting from the surface of the phosphor 45 can be regulated. Since, as stated above the tip of the cladding portion 43 is rounded the grains of phosphor 45 naturally drop into the pit 44 from the tip of the cladding portion 43 without adhering to the surface of the cladding portion 43.

Subsequently, a solution comprising a heat-decomposable polymer compound such as nitrocellulose or acrylic resin dissolved in an organic solvent fills up the pit 44 to the surface of the phosphor 45. The filling is forcibly effected by use of a centrifuge. After the polymer compound is dried, aluminum is deposited on its surface. Thereafter, as being heated at 350° C. in the atmosphere, the polymer compound is decomposed and eliminated. Consequently, the metal back layer 46 made of Al is formed.

Figure 6:
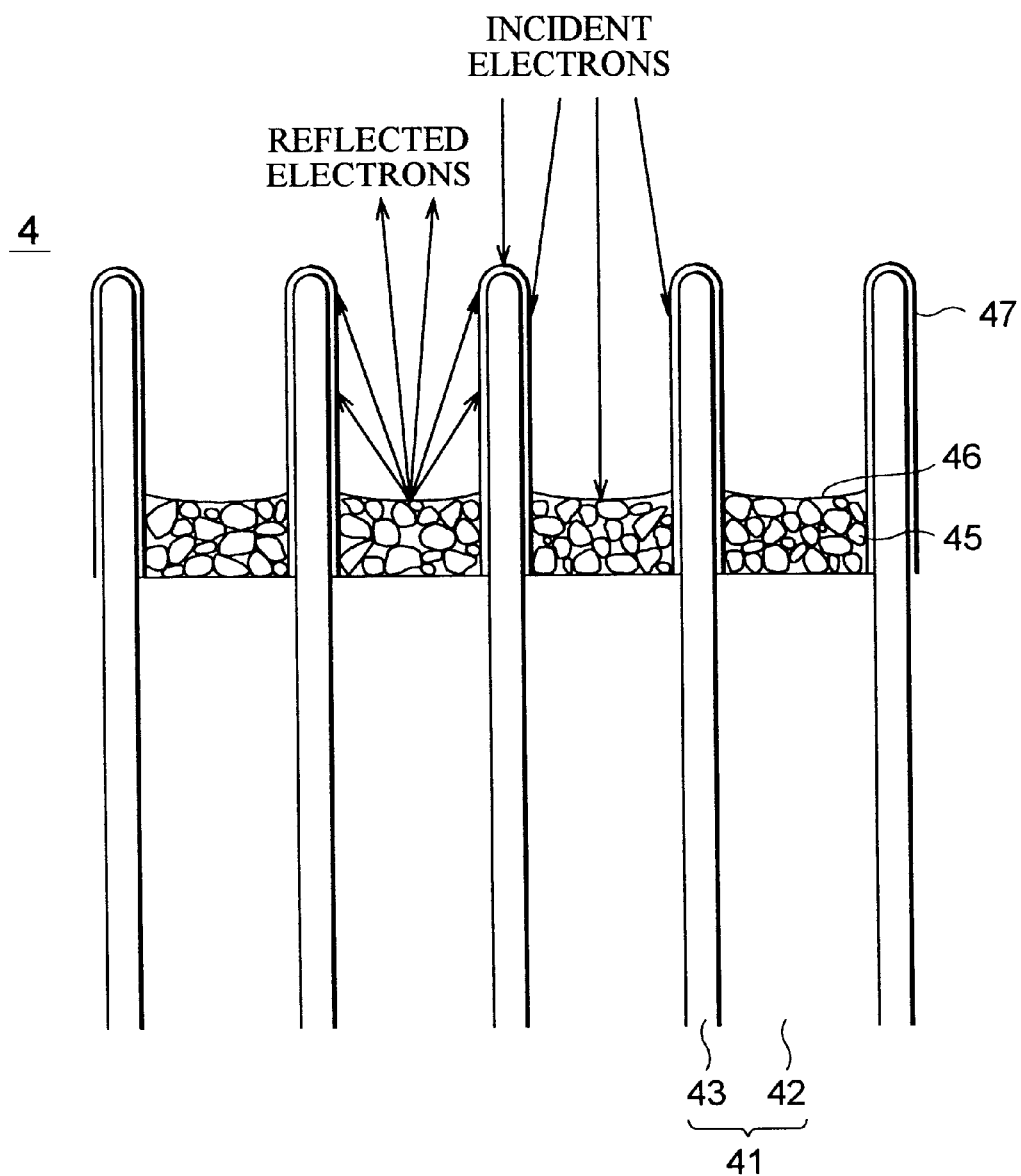

In the following, with reference to FIGS. 6 and 7, explanation will be provided for operations of the optical fiber block 4 in accordance with this embodiment when an electron is incident on the phosphor face 3 from the MCP 2 shown in FIG. 2. FIGS. 6 and 7 are views each showing tracks of incident and reflected electrons in the vicinity of the entrance surface of the optical fiber block 4.

The incident electron directed toward the phosphor face 3 from the MCP 2 shown in FIG. 2 reaches the entrance surface (corresponding to a plane connecting the respective tips of the cladding portions 43) of the optical fiber block 4 as shown in FIG. 6. A portion of the incident electrons reach the metal back layer 46, whereas the rest reach the metal layer 47 on the top and wall surfaces of the cladding portion 43 projecting toward the entrance surface from the metal back layer 46. A major portion of the electrons that reached the surface of the metal back layer 46 pass through the metal back layer 46 so as to impinge on the phosphor 45, thereby generating light. As the metal back layer 46 reflects the light generated in the phosphor 45 toward the core portion 42, the light is efficiently transmitted toward the core portion 42. About 3% of the electrons that reached the metal back layer 46 are diffusely reflected by its surface. On the other hand, a major portion of the electrons that directly reached the cladding portion 43 are absorbed by the metal film 47, leaving about 3% thereof to be diffusely reflected.

As shown in FIG. 7, a portion of the reflected electrons travel along a track such as that indicated by A and directly impinge on the metal film 47 on the wall surface of the cladding portion 43. Since the reflectivity of the metal film 47 is as low as about 3%, the amount of electrons jumping out of the entrance surface of the optical fiber block beyond the top part of the cladding portion 43, after being reflected by the wall surface of the cladding portion 43, is negligible.

The reflected electrons that jump out of the entrance surface of the optical fiber block without directly impinging on the wall surface of the cladding portion 43 (see tracks B to D), return back toward the entrance surface of the optical fiber block due to the electric field formed between the MCP 2 and the phosphor face 3 (i.e. metal back layer 46 here). Since most of the returning electrons impinge on the top part (see track B) or wall surface (see track C) of the cladding portion without reaching the surface of the metal back layer 46, only a very small portion of all incident electrons contribute to fluorescence. This small portion is attributed to the returning electrons that impinge on the phosphor 45 after being incident on the metal back layer 46 (see track D).

While almost all the reflected electrons A to D are deemed to be made incident on the phosphor face 3 again in the conventional example, the amount of the reflected electrons reentering the phosphor face 3 is reduced in this embodiment. Consequently, the halo phenomenon caused by the reflected electrons can be suppressed, thus allowing a high resolution to be kept even with respect to strong incident spot light.

Figure 3:
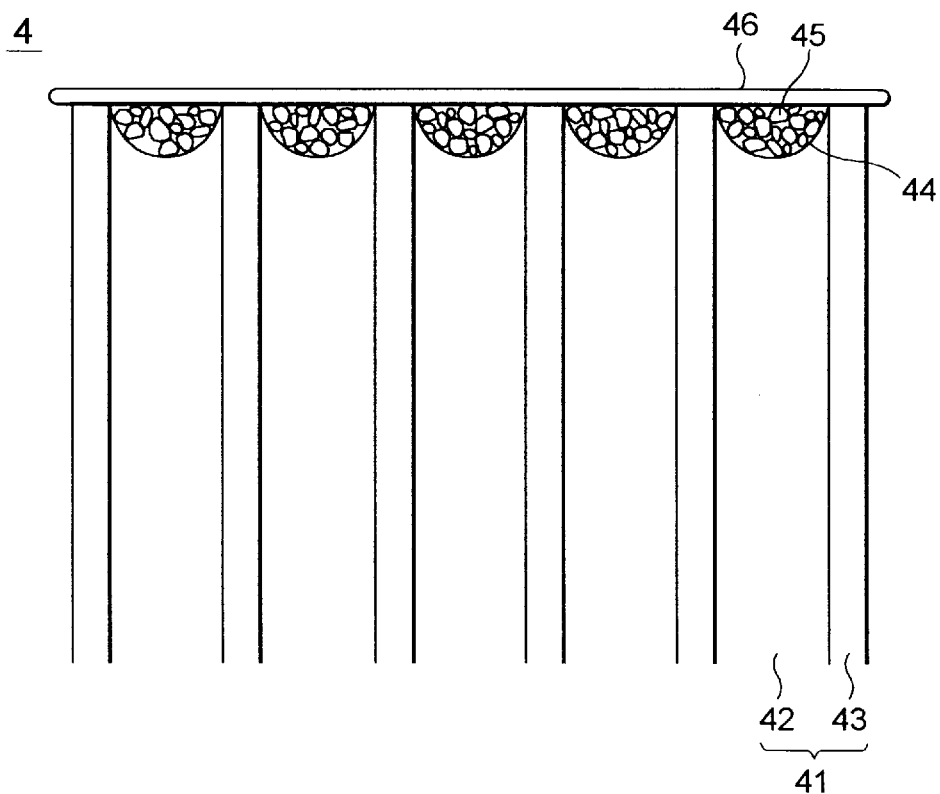
FIG. 3 is an enlarged sectional view showing a conventional optical fiber block on its entrance surface side.
Figure 4:
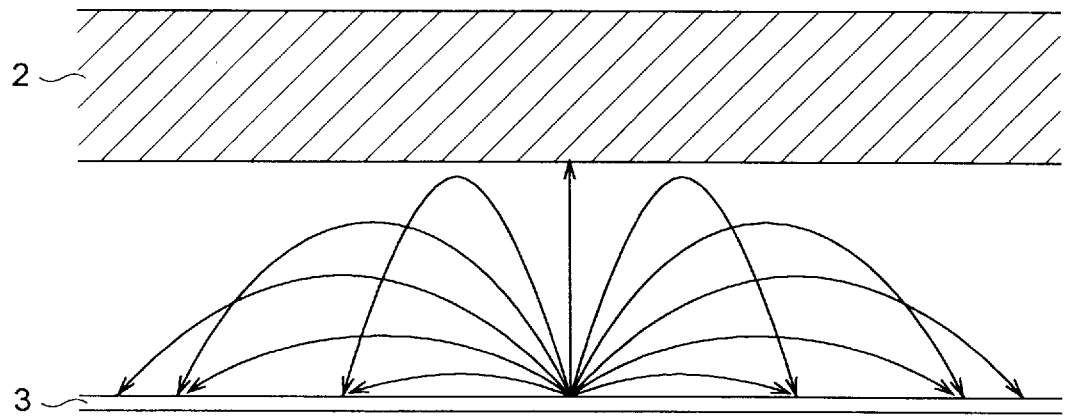
FIG. 4 is a view showing a state of diffuse reflection of an incident electron in the entrance surface of the conventional optical fiber block.

The inventor conducted an experiment comparing the respective halo phenomena of the image intensifiers for the conventional example as shown in FIG. 3 and the present embodiment shown in FIG. 1.

FIGS. 8A and 8B are perspective and sectional views showing the entrance surface of the optical fiber block in accordance with the present embodiment used for this experiment. The cross section of the core portion of each optical fiber is square with a diameter d of 6 µm, whereas the cladding portion between the core portions has a thickness of 2 µm and a height of 1.5 d, i.e., 9 µm. The conventional example is substantially the same as this embodiment except that the height L of the cladding portion shown in FIGS. 8A and 8B is set to zero. In either case, the distance between the MCP outlet and the optical fiber block inlet is set to 0.7 mm, and a voltage of 6 kV is applied between the MCP and the optical fiber block inlet. The incident light is a spot light having a spot diameter of 0.4 mm with an output luminance of 150 nit. The output light from each optical fiber block is captured by a ⅔-inch CCD and then is subjected to image processing by an image processing apparatus DVS-2000 manufactured by Hamamatsu Photonics K. K., whereby the samples are compared with each other in terms of spatial pattern and intensity distribution.

Figure 9A:
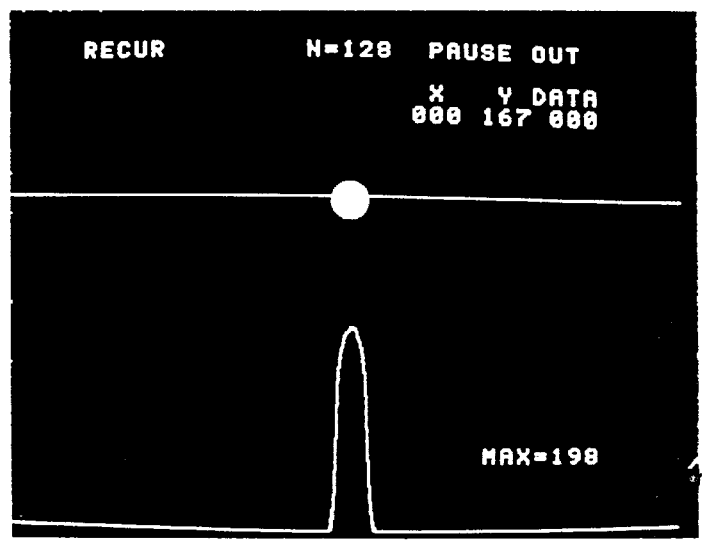
FIGS. 9A, 9B, and 9C are photographs showing images on a display indicating results obtained after image processing of an experiment comparing resolutions of the present invention and a conventional example, respectively corresponding to the input light, the output light of the conventional example, and the output light of the present invention.
Figure 9B:
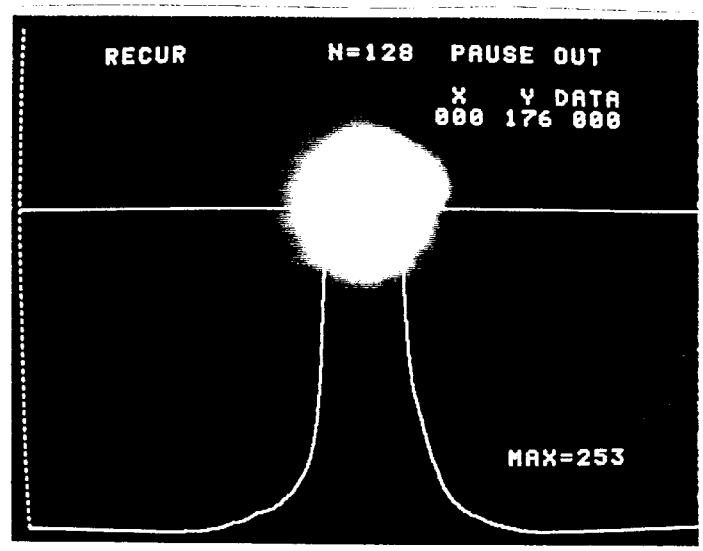
Figure 9C:
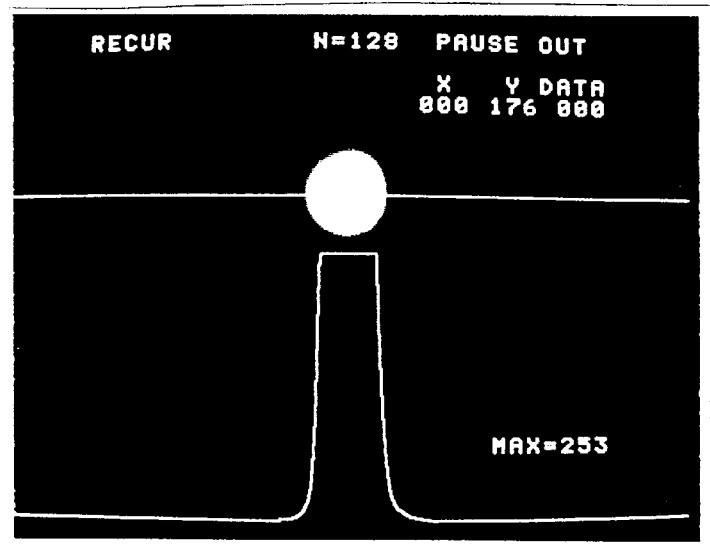

The displayed images obtained as a result of the image processing are shown in FIGS. 9A to 9C. These photographs respectively show the incident light, the output light obtained by the conventional example, and the output light obtained by this embodiment. In each photograph, the upper and lower images respectively indicate the spatial pattern of the light and the intensity distribution of the light in a transverse section. It can be seen from FIGS. 9A to 9C that, when spot light having a very narrow range is given as incident light, output light spreads over a wide range in the conventional example. In particular, its intensity distribution resembles a skirt-like spread area on the periphery which is indicative of the halo phenomenon. In contrast the present embodiment did not generate a spread portion such as the above-mentioned skirt, and it can be seen that the boundary of light is cleaner and more vivid than that in the conventional example. As explained in the foregoing, it has been ascertained that the present embodiment can suppress the halo phenomenon and improve the resolution with respect to a strong spot light.

Further, the inventor conducted a simulation for investigating a relationship between the ratio of the reflected electrons reentering the phosphor face and the height of the cladding portion in the image intensifier of the embodiment shown in FIGS. 8A and 8B. In this simulation, when electrons are incident on one channel of the MCP, the behavior of the electrons reflected by the phosphor face are calculated three-dimensionally by virtue of a Monte Carlo simulation method.

Except for the cladding height, the embodiment is similar as that used in the above-mentioned experiment. The classing height subjected to the calculation. The distance between the MCP outlet and the optical fiber block inlet and the applied voltage were the same as those mentioned above, i.e., 0.7 mm and 6 kV, respectively. It was assumed that electrons were incident with a distribution pattern determined by the electron track analysis when the electrons were incident on one channel of the MCP, and the reflection characteristic in the phosphor face and metal film followed a distribution of $I\theta = I_o \alpha \cos\theta$ wherein incident electron intensity is $I_o$ and reflected electron intensity is $I\theta$ and $\alpha$ is a constant.

Figure 10:
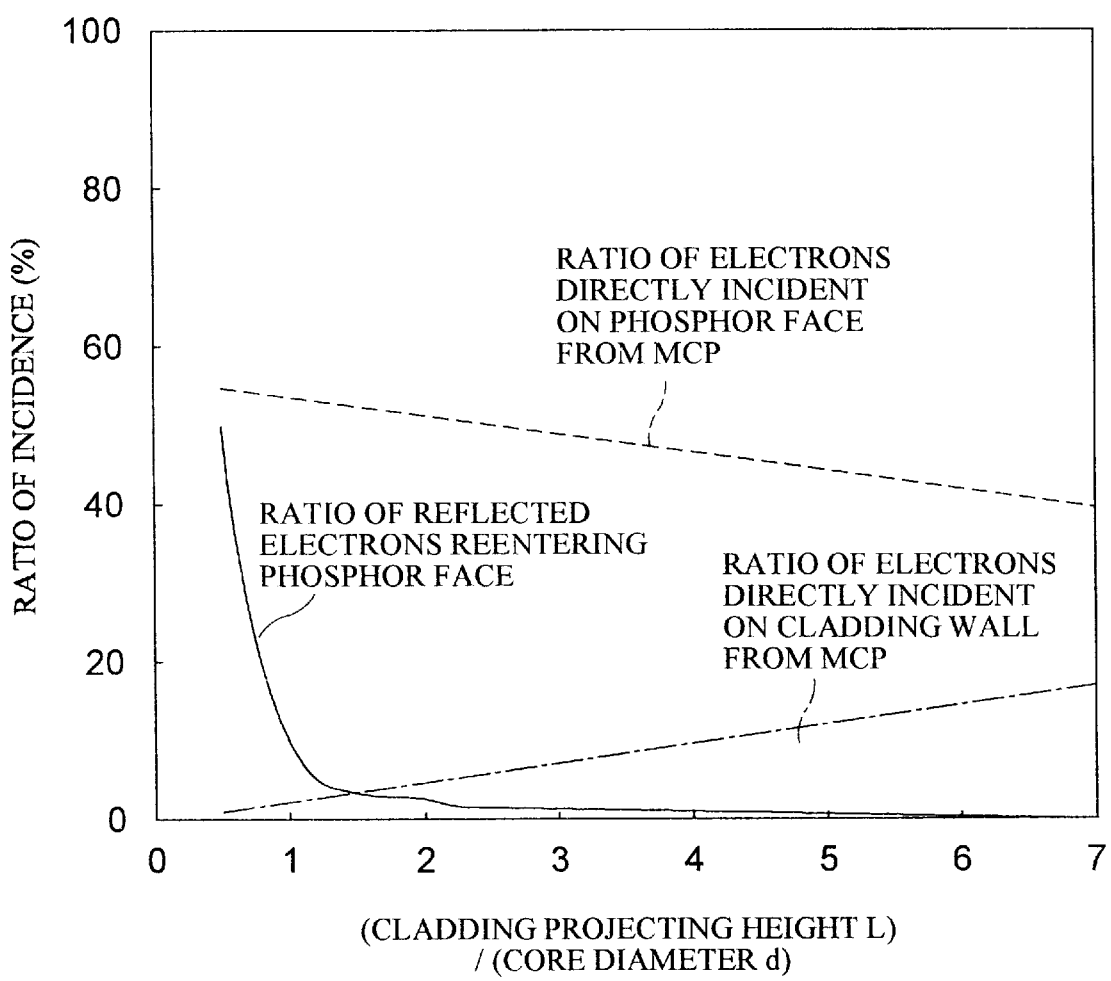
FIG. 10 is a graph showing calculated results of simulation.

FIG. 10 shows the result of this calculation. In this graph, the solid line indicates, of the electrons reflected by the wall surface or top part of the cladding or the phosphor face, the ratio of those re-impinging on the phosphor face and thereby contributing to luminescence. The dashed line indicates, of the electrons emitted from the MCP, the ratio of those directly incident on the phosphor face. The chain line indicates, of the electrons emitted from the MCP, the ratio of those incident on the cladding wall. It can be seen from FIG. 10 that the reentrance of the reflected electrons into the phosphor face decreases to 50% or less when the cladding height L is 0.5 times diameter d of the core portion. As the cladding height L increases, the ratio of reentrance decreases. When L =1 d, the ratio of reflected electrons incident on the phosphor face decreases to 9.3%. Further, when L is 6 times d, the ratio of electrons reentering the phosphor face decreases to 0.3%. Accordingly, L is preferably at least 0.5 d by which the amount of reentering electrons is reduced by at least 50%. More preferably, it is at least 1.0 d by which the amount of reentering electrons becomes 10% or less. Nevertheless, it is not preferable for L to be increased too much, in view of the fact that the ratio of electrons reaching the phosphor face from the MCP decreases and that the manufacture becomes difficult. Accordingly, L is preferably not greater than 6.0 d.

Though the above-mentioned embodiment relates to a proximity-type image intensifier, the present invention is also applicable to image intensifiers of a type using no MCP or those using electronic lenses or the like other than the proximity type. Also, the phosphor face may not be provided with the metal film. The form and arrangement of the optical fibers should not be restricted to those shown in this embodiment.

As explained in the foregoing, in accordance with the present invention, partitioned phosphor faces are provided so as to respectively correspond to individual optical fibers, and are recessed from the entrance surface. Accordingly, a major portion of the electrons reflected by the phosphor faces impinge on the cladding portions projecting from the phosphor faces and are absorbed therein, whereby the amount of electrons reentering the phosphor faces can be reduced. Consequently the halo phenomenon or more specifically, the fluorescence generated around the original spot light as the reflected electrons reenter the phosphor faces when strong spot light is incident, can be prevented. Namely, even when strong spot light is incident thereon, the image intensifier of the present invention can sustain a high resolution. Also, since the boundary of spot light becomes vivid, it is possible to measure the weak light in a region proximate to the spot light. Such weak light has been conventionally hard to measure, given their likelihood of being hidden by the halo.

Also, because the phosphor face is provided with a metal film, the light generated in the phosphor is prevented from leaking into the inner surface of the optical fiber block, whereby the resolution and output can be kept from deteriorating.

Further, the projecting height of the cladding portion is preferably set so as to be at least 0.5 times and, more preferably, at least 1.0 times diameter d of the core portion. Consequently, the halo phenomenon can effectively be suppressed without deteriorating the sensitivity of the light-receiving surface.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image intensifier comprising:

an entrance faceplate composed of light-transparent materials and having a photoelectric surface for photoelectrically converting incident light thereon to an electron, said photoelectric surface being formed opposite to a light-entering surface; and an optical fiber block constituted by a plurality of optical fibers each having a core portion and a cladding portion, said optical fiber block having a phosphor face for emitting light in response to said electron being incident thereon, said phosphor face being formed by a plurality of pits embedded with a phosphor material and being disposed along a light-entering side of an end face of each of said optical fibers, wherein said photoelectric surface of said entrance faceplate and said phosphor face of said optical fiber block are disposed opposite to each other and form a vacuum atmosphere therebetween, wherein each ones of said plurality of pits is formed by recessing an end face of said core portion from an end face of said cladding portion such that said cladding portion projects from a surface of said embedded phosphor material by a predetermined height ranging from 0.5 times a diameter of said core portion to 6.0 times a diameter of said core portion, and wherein a surface of said projecting cladding portion is provided with a metal film.

2. An image intensifier according to claim 1, wherein said surface of said phosphor material embedded in each of said pits is provided with a metal film.

* * * * *